US012793989B1

(12) United States Patent
Abdelaziz et al.

(10) Patent No.: US 12,793,989 B1
(45) Date of Patent: Nov. 10, 2026

(54) METHOD OF FORMING A CATALYST HAVING IRON-NICKEL HYDROXIDE DISPERSED ON REDUCED GRAPHENE OXIDE

(71) Applicant: PRINCE SATTAM BIN ABDULAZIZ UNIVERSITY, Al-Kharj (SA)

(72) Inventors: Doaa Abdelhameed Mohameed Abdelaziz, Al-Kharj (SA); Saba Ameen Abdulraheem Aladeemy, Al-Kharj (SA); Moteb Qahess Mansour Alotaibi, Al-Kharj (SA); Mohammed Faraj Abdullah Alyami, Al-Kharj (SA); Talal Farhan Ahmed Qahtan, Al-Kharj (SA)

(73) Assignee: PRINCE SATTAM BIN ABDULAZIZ UNIVERSITY, Al-Kharj (SA)

( * ) Notice: Subject to any disclaimer, the term of this patent is extended or adjusted under 35 U.S.C. 154(b) by 0 days.

(21) Appl. No.: 19/555,851

(22) Filed: Mar. 3, 2026

(51) Int. Cl.
*H01M 4/90* (2006.01)
*C25B 11/054* (2021.01)
(Continued)

(52) U.S. Cl.
CPC ......... *H01M 4/9075* (2013.01); *C25B 11/054* (2021.01); *C25B 11/067* (2021.01); *C25B 11/075* (2021.01); *H01M 4/9016* (2013.01)

(58) Field of Classification Search
CPC . H01M 4/9075; H01M 4/9016; C25B 11/067; C25B 11/054; C25B 11/075
(Continued)

(56) References Cited

FOREIGN PATENT DOCUMENTS

| | | |
|---|---|---|
| CN | 111450831 B | 6/2021 |
| CN | 113663712 B | 9/2023 |
| CN | 117512675 A | 2/2024 |

OTHER PUBLICATIONS

Candelaria, Stephanie L, et al. Multi-Component FeâNi Hydroxide Nanocatalyst for Oxygen Evolution and Methanol Oxidation Reactions under Alkaline Conditions. vol. 7, No. 1, Dec. 12, 2016, pp. 365â379, https://doi.org/10.1021/acscatal.6b02552. (Year: 2016).*
(Continued)

*Primary Examiner* — Anthony J Zimmer
*Assistant Examiner* — Annette Phan
(74) *Attorney, Agent, or Firm* — Oblon, McClelland, Maier & Neustadt, L.L.P.

(57) ABSTRACT

A method of forming a catalyst including iron-nickel hydroxide supported on reduced graphene oxide includes mixing starch, water and graphene oxide to form a template mixture. The method further includes mixing a first volume of a nickel precursor solution and a second volume of an iron precursor solution with the template mixture to form a bimetallic mixture, followed by casting the bimetallic mixture. The method further includes partially drying the bimetallic mixture to form a semi-dry bimetallic gel and reacting the semi-dry bimetallic gel with sodium borohydride by spraying a sodium borohydride solution on the semi-dry bimetallic gel to at least partially reduce the semi-dry bimetallic gel and form an iron-nickel hydroxide reduced graphene oxide mixture. The method further includes washing with water and acetone and subsequently drying the iron-nickel hydroxide reduced graphene oxide mixture to obtain the catalyst.

18 Claims, 13 Drawing Sheets

(51) Int. Cl.
*C25B 11/067* (2021.01)
*C25B 11/075* (2021.01)

(58) Field of Classification Search
USPC .............................................................. 502/1
See application file for complete search history.

(56) References Cited

OTHER PUBLICATIONS

Chenchen Li, et al., "Enhanced oxygen evolution reaction activity of NiFe layered double hydroxide on nickel foam-reduced graphene oxide interfaces", International Journal of Hydrogen Energy, vol. 44, Issue 5, Jan. 28, 2019, pp. 2656-2663, Excerpts only, 6 pages.
Xinqi Han, et al., "Graphene oxide guiding the constructing of nickel-iron layered double hydroxides arrays as a desirable bifunctional electrocatalyst for HER and OER", International Journal of Hydrogen Energy, vol. 44, Issue 57, Nov. 15, 2019, pp. 29876-29888, Excerpts only, 7 pages.
Amani M. Bamuqaddam, et al., "Foam Synthesis of Nickel/Nickel (II) Hydroxide Nanoflakes Using Double Templates of Surfactant Liquid Crystal and Hydrogen Bubbles: A High-Performance Catalyst for Methanol Electrooxidation in Alkaline Solution", Nanomaterials 2022, vol. 12, No. 879, Mar. 7, 2022, 15 pages.
Weaam A. Al-Sulmi, et al., "Chemical deposition from a liquid crystal template: A highly active mesoporous nickel phosphate electrocatalyst for hydrogen green production via urea electro-oxidation in an alkaline solution", King Saud University, Arabian Journal of Chemistry (2023), vol. 16, 105266, Sep. 16, 2023, 14 pages.
Mohamed A. Ghanen, et al., "Supercapacitance Performance of Mesoporous Nono- and Bi-Metallic Cobalt and Nickel Hydroxides Nanoflakes Chemically Deposited from Foam-Surfactant Liquid Crystal Dual Templates", Journal of The Electrochemical Society, 2024, vol. 171, 010522, Jan. 23, 2024, 10 pages.

* cited by examiner

METHOD OF FORMING A CATALYST HAVING IRON-NICKEL HYDROXIDE DISPERSED ON REDUCED GRAPHENE OXIDE

BACKGROUND

Technical Field

The present disclosure is directed towards a method of forming a catalyst, and more particularly the catalyst includes iron-nickel hydroxide supported on reduced graphene oxide.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The development of efficient oxygen evolution reaction (OER) catalysts remains a major challenge in electrochemical energy conversion, particularly for water splitting and renewable hydrogen production. Conventional OER catalysts based on noble metals such as $IrO_2$ and $RuO_2$ exhibit excellent catalytic activity but are hindered by high cost, scarcity, and limited long-term stability, restricting their large-scale deployment. As cost-effective alternatives, transition metal hydroxides such as $Ni(OH)_2$, $Fe(OH)_3$, and Ni—Fe-based catalysts have been widely investigated; however, these materials often suffer from high overpotentials, sluggish reaction kinetics, and insufficient current densities. Additionally, their poor intrinsic electrical conductivity limits charge transfer efficiency, resulting in reduced overall catalytic performance.

Another significant limitation of existing OER catalysts is their inadequate stability and durability under alkaline operating conditions. Many metal-based catalysts experience rapid degradation due to electrochemical corrosion, phase transformation, agglomeration, and dissolution of active species during prolonged operation. Although the incorporation of carbon-based supports such as graphene oxide has been explored to improve conductivity and stability, previously reported systems frequently suffer from non-uniform metal dispersion, irreversible aggregation, and poor adhesion between the active phase and the support. These issues lead to inconsistent catalytic performance, reduced active site utilization, and diminished long-term operational reliability.

Furthermore, conventional synthesis routes for OER catalysts are often complex, energy-intensive, and environmentally unfriendly. Many reported methods rely on high-temperature calcination, synthetic surfactants, or multi-step fabrication processes that increase energy consumption, cost, and environmental burden, while also limiting scalability. In addition, poor control over catalyst morphology and porosity in existing approaches results in limited electrochemically active surface area and inefficient mass transport. These challenges highlight the ongoing need for sustainable, low-temperature, and scalable synthesis strategies capable of producing highly conductive, stable, and structurally well-defined OER catalysts with enhanced activity and durability.

Accordingly, it is one object of the present invention to provide a process for making catalysts for use in an efficient and durable electrocatalytic system for oxygen evolution reactions that exhibits low overpotential, enhanced charge transfer, and long-term operational stability under alkaline conditions.

SUMMARY

In an exemplary embodiment, a method of forming a catalyst including iron-nickel hydroxide supported on reduced graphene oxide includes mixing starch, water and graphene oxide to form a template mixture. The method further includes mixing a first volume of a nickel precursor solution and a second volume of an iron precursor solution with the template mixture to form a bimetallic mixture, followed by casting the bimetallic mixture. The method further includes partially drying the bimetallic mixture to form a semi-dry bimetallic gel and reacting the semi-dry bimetallic gel with sodium borohydride by spraying a sodium borohydride solution on the semi-dry bimetallic gel to at least partially reduce the semi-dry bimetallic gel and form an iron-nickel hydroxide reduced graphene oxide mixture. The method further includes washing with water and acetone and subsequently drying the iron-nickel hydroxide reduced graphene oxide mixture to obtain the catalyst.

In some embodiments, the reacting of the semi-dry bimetallic gel with sodium borohydride is achieved at 20° C. to 80° C.

In some embodiments, the drying of the iron-nickel hydroxide reduced graphene oxide mixture to obtain the catalyst, the iron-nickel hydroxide reduced graphene oxide mixture is centrifuged and dried at 40° C. to 80° C.

In some embodiments, the sodium borohydride solution has a 0.5 to 1.5 molar concentration of sodium borohydride.

In some embodiments, the nickel precursor solution includes nickel nitrate hexahydrate at a 0.25 to 1.0 molar concentration.

In some embodiments, the iron precursor solution includes iron sulfate heptahydrate at a 0.25 to 1.0 molar concentration.

In some embodiments, a ratio of (second volume:first volume) is from (2:5) to (4:5).

In some embodiments, the catalyst has a mesoporous structure.

In some embodiments, the mesoporous structure has oxygen vacancies.

In some embodiments, the catalyst has a nanocrystalline structure.

In some embodiments, the iron-nickel hydroxide is uniformly dispersed on the reduced graphene oxide.

In some embodiments, the catalyst has $Ni^{2+}/Ni^{3+}$ and $Fe^{2+}/Fe^{3+}$ oxidation states.

In some embodiments, an electrochemical performance of the catalyst is characterized by a tafel slope from 50 mV/dec to 70 mV/dec when the catalyst is loaded on carbon paper electrode in 1 M NaOH and by an overpotential of less than 400 m V at 10 $mA/cm^2$ based on cyclic voltammetry of the catalyst loaded on carbon paper electrode in 1 M NaOH at a scan rate of 50 mV/s.

In some embodiments, during chronoamperometry electrochemical stability testing of the catalyst, the catalyst exhibits a catalytic activity loss less than 2% to 10% after 4 hours at 10 $mA/cm^2$, and during accelerated electrochemical stability testing of the catalyst, the catalyst retains from 80% to 90% of its initial catalytic activity after 4,500 to 5,500 cyclic voltammetry cycles in alkaline media.

In some embodiments, the catalyst includes iron-nickel hydroxide supported on reduced graphene oxide.

In another exemplary embodiment, a method of forming a catalyst including nickel hydroxide supported on reduced graphene oxide is described. The method includes mixing starch, water and graphene oxide to form a template mixture. The method further includes mixing a nickel precursor solution with the template mixture to form a metallic mixture, followed by casting the metallic mixture. The method further includes partially drying the metallic mixture to form a semi-dry metallic gel and then reacting the semi-dry metallic gel with sodium borohydride by spraying a sodium borohydride solution on the semi-dry metallic gel to at least partially reduce the semi-dry metallic gel and form a nickel/nickel hydroxide reduced graphene oxide mixture followed by washing with water and acetone, and subsequently drying the nickel/nickel hydroxide reduced graphene oxide mixture to obtain the catalyst.

In some embodiments, the nickel/nickel hydroxide has a nickel metal core coated with a layer of nickel (II) hydroxide.

In some embodiments, reacting the semi-dry metallic gel with sodium borohydride is achieved at 20° C. to 80° C.

In some embodiments, the catalyst has sheet-like morphology.

In some embodiments, the catalyst includes nickel/nickel hydroxide supported on reduced graphene oxide.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
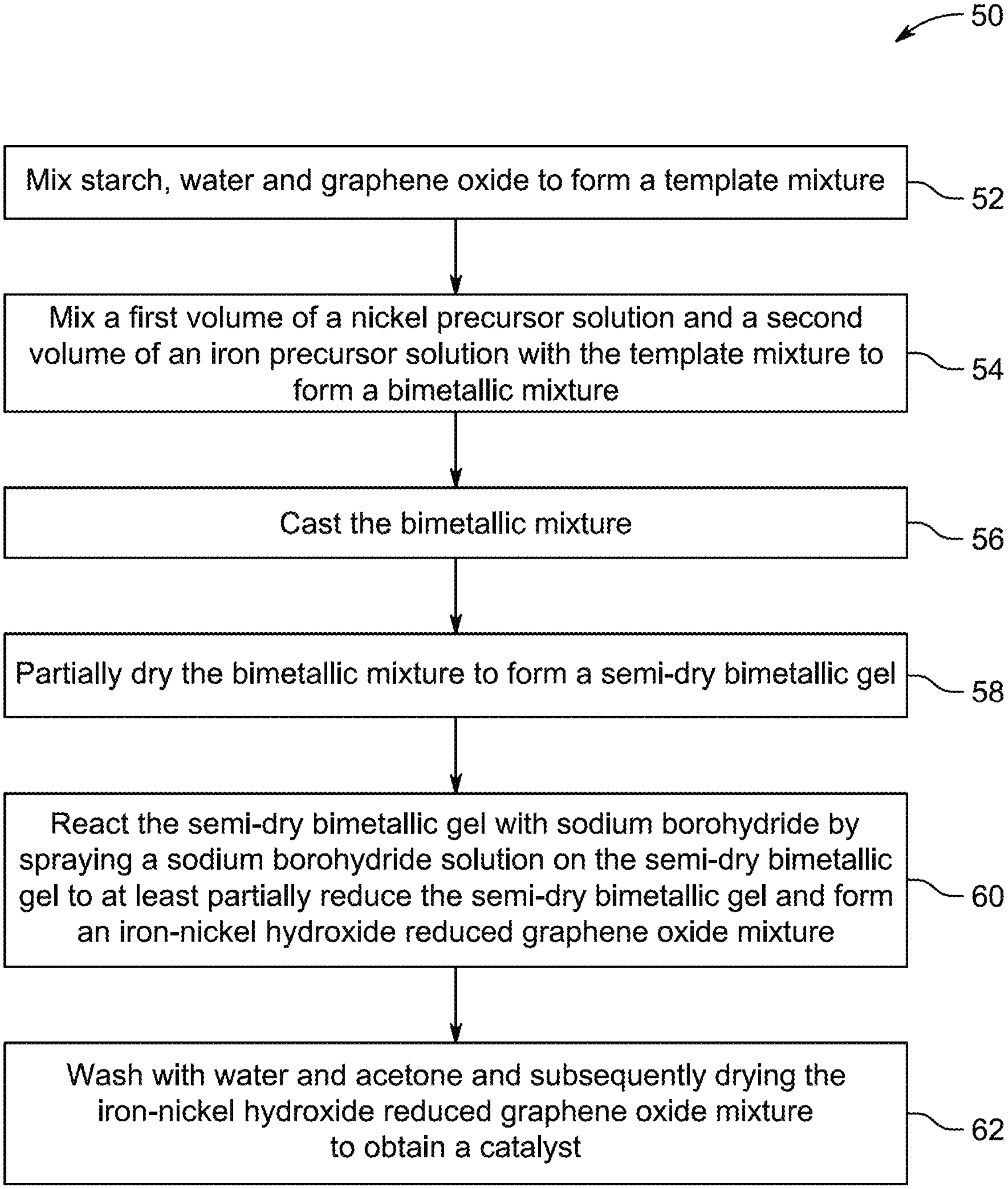
FIG. 1A is an exemplary flowchart of a method of forming a catalyst including iron-nickel hydroxide supported on reduced graphene oxide (Fe—Ni(OH)@rGO), according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (C)±3° C. in the present disclosure.

As used herein, the term 'oxygen evolution reactions' refers to an anodic electrochemical process involving the oxidation of water or hydroxide ions to generate molecular oxygen, accompanied by the transfer of electrons and protons, typically occurring in alkaline, neutral, or acidic electrolytes.

As used herein, the term 'liquid crystal template-assisted synthesis' refers to a material fabrication approach in which an ordered liquid crystal phase directs the nucleation, growth, and spatial arrangement of catalytic components, thereby enabling controlled morphology, porosity, and structural uniformity.

As used herein, the term 'electrochemical performance' refers to the measurable behavior of a material or device under electrochemical conditions, including parameters such as overpotential, current density, charge-transfer resistance, reaction kinetics, efficiency, and operational stability.

As used herein, the term 'tafel slope' refers to a kinetic parameter derived from the Tafel equation that represents the relationship between overpotential and the logarithm of current density, and is indicative of the reaction rate and rate-determining step in an electrochemical process.

As used herein, the term 'chronoamperometry electrochemical stability testing' refers to an electrochemical evaluation technique in which a constant potential is applied to an electrode over an extended period while monitoring the resulting current response to assess catalyst durability and operational stability.

As used herein, the term 'catalytic activity loss' refers to a reduction in catalytic efficiency or reaction rate over time, as evidenced by decreased current density, increased overpotential, or diminished reaction kinetics during electrochemical operation.

As used herein, the term 'accelerated electrochemical stability testing' refers to a testing protocol designed to rapidly evaluate catalyst durability by subjecting the material to intensified electrochemical conditions, such as repeated potential cycling or elevated current densities, to simulate long-term operational stress within a shortened timeframe.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

Aspects of the present disclosure relate to a high-performance Fe—Ni(OH)@rGO electrocatalyst for oxygen evolution reactions, produced via liquid crystal template-assisted synthesis and in-situ $NaBH_4$ reduction, delivering enhanced electrochemical activity and conductivity through rGO integration for scalable, cost-effective energy applications.

FIG. 1A illustrates a schematic flow chart of a method 50 of forming a catalyst including iron-nickel hydroxide supported on reduced graphene oxide. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing starch, water and graphene oxide to form a template mixture.

In some embodiments, a natural surfactant may include but is not limited to saponin, lecithin, gum arabic, gelatin, casein, chitosan, alginate, pectin, carrageenan, xanthan gum, guar gum, locust bean gum, konjac gum, agar, sodium alginate, biosurfactant rhamnolipids, sophorolipids, mannosylerythritol lipids, surfactin, iturin, fengycin, quillaja extract, yucca extract, soapnut extract, bile salts, whey protein isolate, soy protein isolate, and zein. In a preferred embodiment, the natural surfactant is starch.

In some embodiments, the water may include but is not limited to deionized water, ultrapure water, double-distilled water, Milli-Q water, reverse osmosis water, softened water, sterile water, purified water, laboratory-grade water, pharmaceutical-grade water, injection water, irrigation water, mineral-free water, desalinated water, groundwater, spring water, well water, tap water, municipal water, river water, lake water, reservoir water, rainwater, ice-melt water, glacial water, brackish water, and reclaimed water. In a preferred embodiment, water is distilled water.

In some embodiments, starch is dissolved in distilled water at a temperature ranging from 20-100° C., preferably 30-100° C., preferably 40-100° C., preferably 50-100° C., preferably 60-100° C., preferably 70-100° C., preferably 80-100° C., preferably 90-100° C. In a preferred embodiment, starch is dissolved in distilled water at a temperature of 60° C.

At step 54, the method 50 includes mixing a first volume of a nickel precursor solution and a second volume of an iron precursor solution with the template mixture to form a bimetallic mixture.

In some embodiments, the nickel precursor may include but is not limited to nickel chloride, nickel chloride hexahydrate, nickel sulfate, nickel sulfate hexahydrate, nickel acetate, nickel acetate tetrahydrate, nickel oxalate, nickel carbonate, basic nickel carbonate, nickel hydroxide, nickel oxide, nickel nitrate nonahydrate, nickel formate, nickel citrate, nickel lactate, nickel tartrate, nickel gluconate, nickel perchlorate, nickel perchlorate hexahydrate, nickel bromide, nickel bromide hydrate, nickel fluoride, nickel iodide, nickel acetylacetonate, nickel ethoxide, nickel methoxide, nickel stearate, nickel oleate, and nickel palmitate. In a preferred embodiment, the nickel precursor is nickel nitrate hexahydrate ($Ni(NO_3)_2 \cdot 6H_2O$).

In some embodiments, the iron precursor may include but is not limited to iron chloride, iron chloride hexahydrate, iron chloride tetrahydrate, iron sulfate, iron sulfate monohydrate, iron nitrate nonahydrate, iron nitrate hexahydrate, iron acetate, iron acetate hydrate, iron oxalate, iron carbonate, iron hydroxide, iron oxide, iron citrate, iron lactate, iron tartrate, iron gluconate, iron perchlorate, iron perchlorate hydrate, iron bromide, iron bromide hydrate, iron fluoride, iron iodide, iron acetylacetonate, iron ethoxide, iron methoxide, iron stearate, iron oleate, iron palmitate, and iron formate. In a preferred embodiment, the iron precursor is iron sulfate heptahydrate ($FeSO_4 \cdot 7H_2O$).

In some embodiments, the nickel and iron precursor solution concentration ranges from 0.25 to 1.0 molar, preferably 0.3 to 1.0 M, preferably 0.35 to 1.0 M, preferably 0.4 to 1.0 M, preferably 0.45 to 1.0 M, preferably 0.5 to 1.0 M, preferably 0.55 to 1.0 M, preferably 0.6 to 1.0 M, preferably 0.65 to 1.0 M, preferably 0.7 to 1.0 M, preferably 0.75 to 1.0 M, preferably 0.8 to 1.0 M, preferably 0.85 to 1.0 M, preferably 0.9 to 1.0 M, preferably 0.95 to 1.0 M. In a preferred embodiment, the nickel and iron precursor solution concentration is 0.5 M.

In some embodiments, the ratio of (second volume:first volume) ranges from (2:5) to (4:5), preferably (2.5:5) to (4:5), preferably (3:5) to (4:5), preferably (3.5:5) to (4:5), preferably (4:5) to (4:5), preferably (4.5:5) to (4:5). In a preferred embodiment, the ratio of (second volume:first volume) is from (2:5) to (4:5).

At step 56, the method 50 includes casting the bimetallic mixture. In some embodiments, casting the bimetallic mixture may be performed on a glass substrate, glass slide, microscope slide, quartz plate, silicon wafer, stainless steel plate, aluminum foil, Teflon sheet, polypropylene sheet, polyethylene sheet, polystyrene tray, ceramic plate, porcelain tile, alumina plate, or mica sheet. In a preferred embodiment, casting is done on Petri dish.

At step 58, the method 50 includes partially drying the bimetallic mixture to form a semi-dry bimetallic gel. In some embodiments, drying may be performed by oven drying, vacuum drying, freeze drying, spray drying, infrared drying, microwave drying, hot air drying, air drying, desiccator drying, rotary drying, fluidized bed drying, tray drying, belt drying, drum drying, flash drying, superheated steam drying, solar drying, low-temperature drying, convection drying, or radiant drying. In a preferred embodiment, drying is done by water evaporation.

At step 60, the method 50 includes reacting the semi-dry bimetallic gel with sodium borohydride by spraying a sodium borohydride solution on the semi-dry bimetallic gel to at least partially reduce the semi-dry bimetallic gel and form an iron-nickel hydroxide reduced graphene oxide mixture. The sodium borohydride solution is preferably sprayed as a mist on to the semi-dry bimetallic gel in an amount such that an molar excess of sodium borohydride with respect to the amount needed to reduce the nickel and iron precursors is deposited onto the semi-dry bimetallic gel. In a preferable embodiment the resultant gel composition is heated, shaken and/or subject to ultrasonification to promote intrusion of the sodium borohydride into the semi-dry bimetallic gel to promote reaction of the metal precursors with the sodium borohydride.

In some embodiments, reduction may be performed by hydrazine hydrate, potassium borohydride, lithium borohydride, calcium borohydride, lithium aluminum hydride, formic acid, formaldehyde, ascorbic acid, glucose, ethylene glycol, polyol reduction, hydrogen gas, ammonia borane, dimethylamine borane, sodium hypophosphite, phosphorous acid, sodium dithionite, sodium sulfite, electrochemical reduction, photochemical reduction, or thermal reduction. In a preferred embodiment, reduction is done by spraying sodium borohydride ($NaBH_4$).

In some embodiments, the sodium borohydride solution has a 0.5 to 1.5 molar, preferably 0.6 to 1.5 M, preferably 0.7 to 1.5 M, preferably 0.8 to 1.5 M, preferably 0.9 to 1.5 M, preferably 1.0 to 1.5 M, preferably 1.1 to 1.5 M, preferably 1.2 to 1.5 M, preferably 1.3 to 1.5 M, preferably 1.4 to 1.5 M concentration of sodium borohydride. In a preferred embodiment, the sodium borohydride solution has a 1.0 M concentration of sodium borohydride. The sodium borohydride solution may be a solution in an aqueous or organic solvent such as a polyglycol, an ether, an alcohol, a ketone, and/or an amine, for example methanol, ethanol, tetrahydrofuran, dimethoxyethane, diglyme, triglyme, dimethylformamide, dimethylacetamide, and/or isopropylamine.

In some embodiments, the reacting of the semi-dry bimetallic gel with sodium borohydride is achieved at 20° C. to 80° C., preferably 30° C. to 80° C., preferably 40° C. to 80° C., preferably 50° C. to 80° C., preferably 60° C. to 80° C., preferably 70° C. to 80° C.

At step 62, the method 50 includes washing with water and preferably acetone and subsequently drying the iron-nickel hydroxide reduced graphene oxide mixture to obtain the catalyst.

In some embodiments, during the drying of the iron-nickel hydroxide reduced graphene oxide mixture to obtain the catalyst, the iron-nickel hydroxide reduced graphene oxide mixture is centrifuged and dried at 40° C. to 80° C., preferably 45° C. to 80° C., preferably 50° C. to 80° C., preferably 55° C. to 80° C., preferably 60° C. to 80° C., preferably 65° C. to 80° C., preferably 70° C. to 80° C., preferably 75° C. to 80° C. In a preferred embodiment, the iron-nickel hydroxide reduced graphene oxide mixture is centrifuged, and preferably concurrently dried, at 60° C.

In some embodiments, the iron-nickel hydroxide is homogeneously distributed, evenly dispersed, uniformly anchored, well-dispersed, finely distributed, consistently spread, uniformly decorated, homogeneously anchored, evenly coated, uniformly immobilized, well-anchored, uniformly supported, homogeneously coated, evenly immobilized, uniformly integrated, finely anchored, consistently dispersed, uniformly embedded, homogeneously supported, or evenly integrated on the reduced graphene oxide. In a preferred embodiment, the iron-nickel hydroxide is uniformly dispersed on the reduced graphene oxide.

In some embodiments, the catalyst has a crystalline structure, amorphous structure, polycrystalline structure, quasi-crystalline structure, lamellar structure, layered structure, fibrous structure, granular structure, dense structure, or hierarchical structure. In a preferred embodiment, the catalyst has a nanocrystalline structure.

In some embodiments, the catalyst has a microporous structure, macroporous structure, hierarchical porous structure, interpenetrated porous structure, sponge-like structure, foam-like structure, honeycomb structure, channeled structure, pillared structure, slit-shaped porous structure, cage-like porous structure, interconnected porous structure, fractal porous structure, ordered porous structure, or disordered porous structure. In a preferred embodiment, the catalyst has a mesoporous structure.

In some embodiments, the mesoporous structure has cation vacancies, anion vacancies, lattice distortions, crystal defects, dislocations, grain boundaries, stacking faults, interstitial defects, antisite defects, point defects, line defects, planar defects, surface defects, extended defects, or electronic defects. In a preferred embodiment, the mesoporous structure has oxygen vacancies.

In some embodiments, the catalyst has a nickel oxidation state of $Ni^0$, $Ni^{1+}$, $Ni^{4+}$, metallic nickel, subvalent nickel, high-valent nickel, mixed-valent nickel, zero-valent nickel, monovalent nickel, or tetravalent nickel. In some embodiment, the catalyst has a nickel oxidation state of $Ni^{2+}/Ni^{3+}$.

In some embodiments, the catalyst has an iron oxidation state of $Fe^0$, $Fe^{1+}$, $Fe^{4+}$, $Fe^{5+}$, $Fe^{6+}$, metallic iron, subvalent iron, high-valent iron, zero-valent iron, or hypervalent iron. In a preferred embodiment, the catalyst has an iron oxidation state of $Fe^{2+}/Fe^{3+}$.

In some embodiments, an electrochemical performance of the catalyst is characterized by a tafel slope ranges from 50 mV/dec to 70 m V/dec, preferably 55 mV/dec to 60 mV/dec, preferably 65 m V/dec to 70 mV/dec, preferably 50 mV/dec to 70 mV/dec when the catalyst is loaded on carbon paper electrode in 1 M NaOH and by an overpotential of less than 400 mV at 10 mA/cm$^2$ based on cyclic voltammetry of the catalyst loaded on carbon paper electrode in 1 M NaOH at a scan rate of 50 mV/s. In a preferred embodiment, the tafel slope of iron-nickel hydroxide reduced graphene oxide is 60 mV/dec.

In some embodiments, during chronoamperometry electrochemical stability testing of the catalyst, the catalyst exhibits a catalytic activity loss less than 2% to 10%, preferably less than 3% to 10%, preferably less than 4% to 10%, preferably less than 5% to 10%, preferably less than 6% to 10%, preferably less than 7% to 10%, preferably less than 8% to 10%, preferably less than 2% to 10% after 4 hours at 10 mA/cm$^2$. In a preferred embodiment, the catalyst exhibits a catalytic activity loss less than 5%.

In some embodiments, during accelerated electrochemical stability testing of the catalyst, the catalyst retains from 80% to 90%, preferably 82% to 90%, preferably 84% to 90%, preferably 86% to 90%, preferably 88% to 90% of its initial catalytic activity after 4,500 to 5,500, preferably 4,700 to 5,500, preferably 4,900 to 5,500, preferably 5,100 to 5,500, preferably 5,300 to 5,500 cyclic voltammetry cycles in alkaline media. In a preferred embodiment, the catalyst retains 85% of its initial catalytic activity after 5,000 cyclic voltammetry cycles in alkaline media.

Figure 1B:
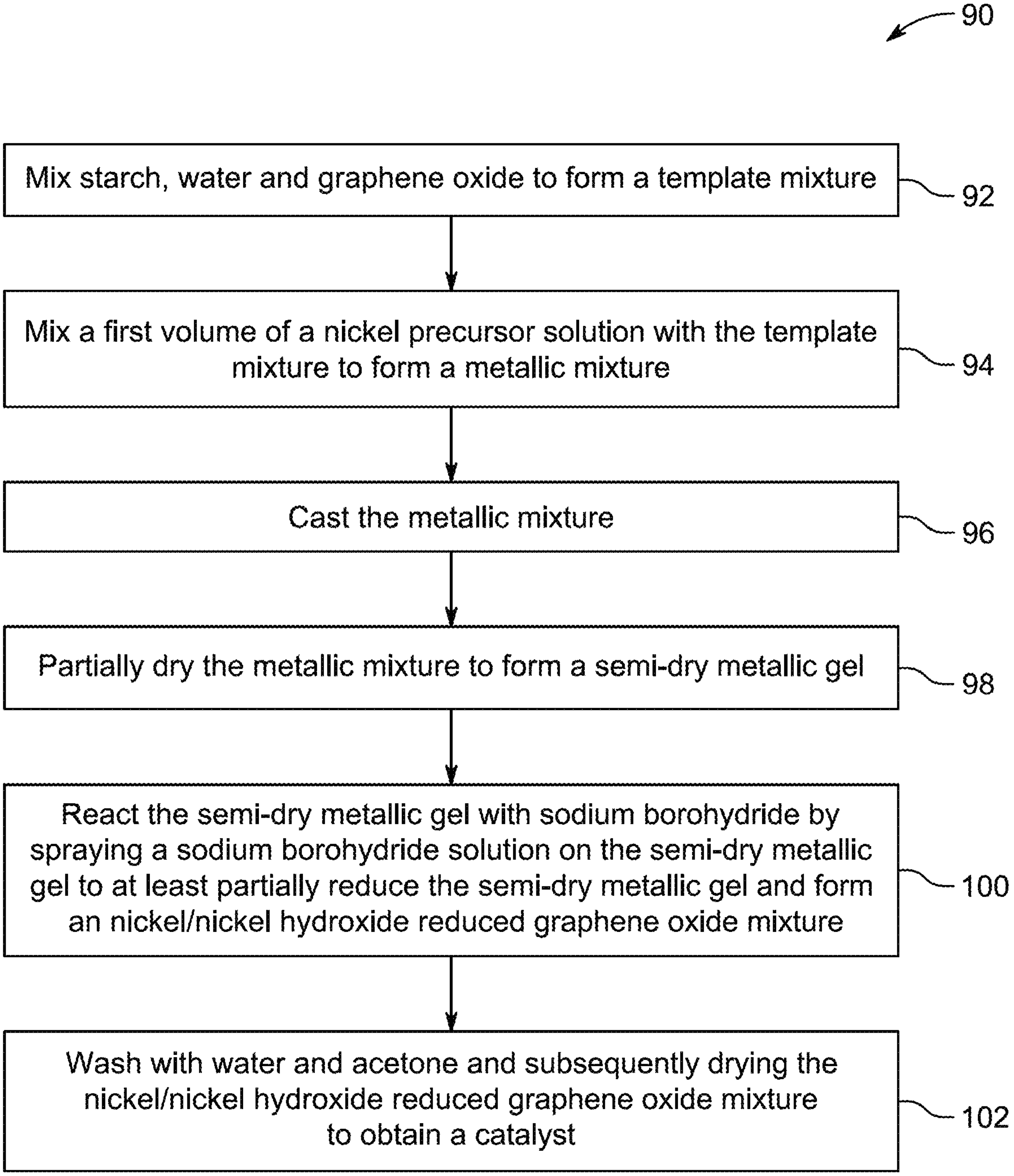
FIG. 1B is an exemplary flowchart of a method of forming a catalyst including nickel-nickel hydroxide supported on reduced graphene oxide (Ni/Ni$(OH)_2$@rGO), according to certain embodiments.

FIG. 1B illustrates a schematic flow chart of a method 90 of forming a catalyst including nickel-nickel hydroxide supported on reduced graphene oxide. The order in which the method 90 is described is not intended to be construed as a limitation, and any number of the described method steps can be combined to implement the method 90. Additionally, individual steps may be removed or skipped from the method 90 without departing from the spirit and scope of the present disclosure.

At step 92, the method 90 includes mixing starch, water and graphene oxide to form a template mixture.

In some embodiments, a natural surfactant may include but is not limited to saponin, lecithin, gum arabic, gelatin, casein, chitosan, alginate, pectin, carrageenan, xanthan gum, guar gum, locust bean gum, konjac gum, agar, sodium alginate, biosurfactant rhamnolipids, sophorolipids, mannosylerythritol lipids, surfactin, iturin, fengycin, quillaja extract, yucca extract, soapnut extract, bile salts, whey protein isolate, soy protein isolate, and zein. In a preferred embodiment, the natural surfactant is starch.

In some embodiments, the water may include but is not limited to deionized water, ultrapure water, double-distilled water, Milli-Q water, reverse osmosis water, softened water, sterile water, purified water, laboratory-grade water, pharmaceutical-grade water, injection water, irrigation water, mineral-free water, desalinated water, groundwater, spring water, well water, tap water, municipal water, river water, lake water, reservoir water, rainwater, ice-melt water, glacial water, brackish water, and reclaimed water. In a preferred embodiment, water is distilled water.

In some embodiments, starch is dissolved in distilled water at a temperature ranging from 20-100° C., preferably 30-100° C., preferably 40-100° C., preferably 50-100° C., preferably 60-100° C., preferably 70-100° C., preferably 80-100° C., preferably 90-100° C. In a preferred embodiment, starch is dissolved in distilled water at a temperature of 60° C.

At step 94, the method 90 includes mixing a nickel precursor solution with the template mixture to form a metallic mixture.

In some embodiments, the nickel precursor may include but is not limited to nickel chloride, nickel chloride hexahydrate, nickel sulfate, nickel sulfate hexahydrate, nickel acetate, nickel acetate tetrahydrate, nickel oxalate, nickel carbonate, basic nickel carbonate, nickel hydroxide, nickel oxide, nickel nitrate nonahydrate, nickel formate, nickel citrate, nickel lactate, nickel tartrate, nickel gluconate, nickel perchlorate, nickel perchlorate hexahydrate, nickel bromide, nickel bromide hydrate, nickel fluoride, nickel iodide, nickel acetylacetonate, nickel ethoxide, nickel methoxide, nickel stearate, nickel oleate, and nickel palmitate. In a preferred embodiment, the nickel precursor is nickel nitrate hexahydrate ($Ni(NO_3)_2 \cdot 6H_2O$).

In some embodiments, the nickel precursor solution concentration ranges from 0.25 to 1.0 molar, preferably 0.3 to 1.0 M, preferably 0.35 to 1.0 M, preferably 0.4 to 1.0 M, preferably 0.45 to 1.0 M, preferably 0.5 to 1.0 M, preferably 0.55 to 1.0 M, preferably 0.6 to 1.0 M, preferably 0.65 to 1.0 M, preferably 0.7 to 1.0 M, preferably 0.75 to 1.0 M, preferably 0.8 to 1.0 M, preferably 0.85 to 1.0 M, preferably 0.9 to 1.0 M, preferably 0.95 to 1.0 M. In a preferred embodiment, the nickel and iron precursor solution concentration is 0.5 M.

At step 96, the method 90 includes casting the metallic mixture. In some embodiments, casting the metallic mixture may be performed on a glass substrate, glass slide, microscope slide, quartz plate, silicon wafer, stainless steel plate, aluminum foil, Teflon sheet, polypropylene sheet, polyethylene sheet, polystyrene tray, ceramic plate, porcelain tile, alumina plate, or mica sheet. In a preferred embodiment, casting is done on Petri dish.

At step 98, the method 90 includes partially drying the metallic mixture to form a semi-dry metallic gel. In some embodiments, drying may be performed by oven drying, vacuum drying, freeze drying, spray drying, infrared drying, microwave drying, hot air drying, air drying, desiccator drying, rotary drying, fluidized bed drying, tray drying, belt drying, drum drying, flash drying, superheated steam drying, solar drying, low-temperature drying, convection drying, or radiant drying. In a preferred embodiment, drying is done by water evaporation At step 100, the method 90 includes reacting the semi-dry metallic gel with sodium borohydride by spraying a sodium borohydride solution on the semi-dry metallic gel to at least partially reduce the semi-dry metallic gel and form a nickel/nickel hydroxide reduced graphene oxide mixture. Conditions for spraying such as for forming the nickel and iron precursor based material may be employed.

In some embodiments, reduction may be performed by hydrazine hydrate, potassium borohydride, lithium borohydride, calcium borohydride, lithium aluminum hydride, formic acid, formaldehyde, ascorbic acid, glucose, ethylene glycol, polyol reduction, hydrogen gas, ammonia borane, dimethylamine borane, sodium hypophosphite, phosphorous acid, sodium dithionite, sodium sulfite, electrochemical reduction, photochemical reduction, or thermal reduction. In a preferred embodiment, reduction is done by spraying sodium borohydride ($NaBH_4$).

In some embodiments, the sodium borohydride solution has a 0.5 to 1.5 molar, preferably 0.6 to 1.5 M, preferably 0.7 to 1.5 M, preferably 0.8 to 1.5 M, preferably 0.9 to 1.5 M, preferably 1.0 to 1.5 M, preferably 1.1 to 1.5 M, preferably 1.2 to 1.5 M, preferably 1.3 to 1.5 M, preferably 1.4 to 1.5 M concentration of sodium borohydride. In a preferred embodiment, the sodium borohydride solution has a 1.0 M concentration of sodium borohydride.

In some embodiments, the reacting of the semi-dry bimetallic gel with sodium borohydride is achieved at 20° C. to 80° C., preferably 30° C. to 80° C., preferably 40° C. to 80° C., preferably 50° C. to 80° C., preferably 60° C. to 80° C., preferably 70° C. to 80° C.

At step 102, the method 90 includes washing with water and acetone, and subsequently drying the nickel/nickel hydroxide reduced graphene oxide mixture to obtain the catalyst.

In some embodiments, during the drying of the nickel/nickel hydroxide reduced graphene oxide mixture to obtain the catalyst, the nickel/nickel hydroxide reduced graphene oxide mixture is centrifuged and dried at 40° C. to 80° C., preferably 45° C. to 80° C., preferably 50° C. to 80° C., preferably 55° C. to 80° C., preferably 60° C. to 80° C., preferably 65° C. to 80° C., preferably 70° C. to 80° C., preferably 75° C. to 80° C. In a preferred embodiment, the nickel/nickel hydroxide reduced graphene oxide mixture is centrifuged and dried at 60° C.

In some embodiments, the catalyst has a core-shell structure, metal-hydroxide core-shell architecture, nickel core-nickel hydroxide shell configuration, concentric layered structure, encapsulated metal structure, coated metal structure, metal@hydroxide structure, hybrid core-shell morphology, layered core-shell assembly, or metal-oxide/hydroxide composite structure. In a preferred embodiment, the nickel/nickel hydroxide has a nickel metal core coated with a layer of nickel (II) hydroxide.

In some embodiments, the catalyst has nanosheet morphology, platelet morphology, lamellar morphology, flake-like morphology, layered morphology, two-dimensional morphology, thin-film morphology, planar morphology, sheeted structure, or foliated morphology. In a preferred embodiment, the catalyst has sheet-like morphology.

The following examples are provided solely for illustration and are not to be construed as limitations of the present disclosure, as many variations thereof are possible without departing from the spirit and scope of the present disclosure.

EXAMPLES

The following examples demonstrate a method of forming a catalyst. The examples are provided solely for illustration and are not to be construed as limitations of the present disclosure, as many variations thereof are possible without departing from the spirit and scope of the present disclosure.

Example 1: Material

Nickel nitrate hexahydrate ($Ni(NO_3)_2 \cdot 6H_2O$, 98%) and iron sulfate heptahydrate ($FeSO_4 \cdot 7H_2O$) were used as the respective sources of $Ni^{2+}$ and $Fe^{2+}$ ions. Graphene oxide (GO) was incorporated to enhance electrical conductivity and promote uniform dispersion of active sites. Sodium borohydride ($NaBH_4$, 79%) served as a reducing agent for in-situ hydroxide formation, while sodium hydroxide (NaOH, 99%) was employed as the electrolyte for oxygen evolution reaction (OER) testing. Starch ($(C_6H_{10}O_6)_n$) was utilized as a liquid-crystal template and natural surfactant to regulate morphology, and distilled water was used as the solvent throughout the entire process.

Example 2: Synthesis of Fe—Ni(OH)@rGO Catalysts

Figure 2:
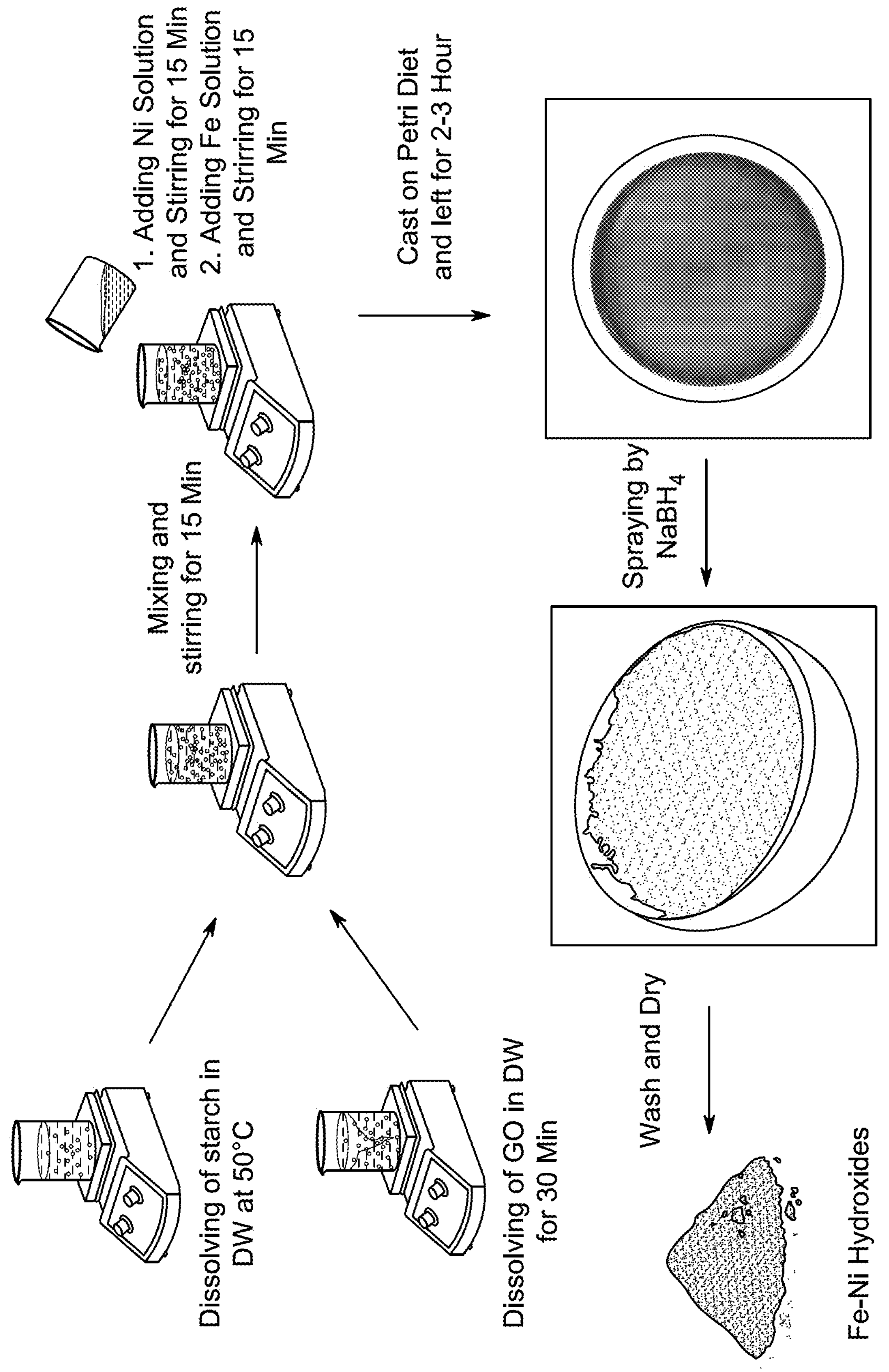
FIG. 2 is a schematic illustration of the synthesis of mesoporous Fe—Ni hydroxides@rGO catalysts via a liquid crystal template approach, according to certain embodiments.

The Fe—Ni(OH)@rGO catalysts were synthesized using a liquid crystal template-assisted method. Initially, starch (1 g) was dissolved in 10 mL of distilled water at 60° C. to form a liquid crystal template, into which 55 mg of graphene oxide (GO) was added and stirred until a homogeneous dispersion was obtained. Separately, 0.5 M aqueous solutions of $Ni(NO_3)_2 \cdot 6H_2O$ and $FeSO_4 \cdot 7H_2O$ were prepared. Subsequently, 5 mL of the nickel nitrate solution was introduced into the starch/GO mixture and stirred for 15 minutes, followed by the addition of varying volumes (2, 3, or 4 mL) of the iron sulfate solution to tune the Fe/Ni ratio. The resulting mixture was then transferred to a petri dish and partially dried by controlled water evaporation. A 1.0 M $NaBH_4$ solution was sprayed onto the semi-dried gel, resulting in a color change from yellowish-brown to black, which indicated the successful in-situ formation of Fe—Ni hydroxide on reduced graphene oxide. Finally, the precipitate was washed repeatedly with distilled water and acetone to remove excess starch, centrifuged, and dried at 60° C. for 24 hours to obtain the Fe—Ni(OH)@rGO catalyst powder (FIG. 2).

The synthesis method employs starch as a natural surfactant and liquid-crystal template to construct a mesoporous network. Nickel nitrate $Ni(NO_3)_2 \cdot 6H_2O$ and iron sulfate ($FeSO_4 \cdot 7H_2O$) serve as the respective metal precursors, while graphene oxide (GO) is incorporated to enhance electrical conductivity and promote uniform dispersion of active sites. The reaction is completed through reduction with sodium borohydride ($NaBH_4$), resulting in the formation of the final $Ni/Ni(OH)_2$@rGO and Fe—Ni(OH)@rGO catalysts.

Example 3: Electrode Fabrication for Electrochemical Testing

For electrode fabrication, a catalyst ink was first prepared by mixing 20 mg of Fe—Ni(OH)@rGO with black carbon (10 wt. %) and polyvinylidene fluoride (PVDF, 10 wt. %) to enhance electrical conductivity and ensure good adhesion to the substrate. The mixture was dispersed in N-methyl-2-pyrrolidone (NMP) and sonicated for 10 minutes to obtain a homogeneous ink. The resulting ink was then manually drop-cast onto a pre-cleaned carbon paper (CP) electrode with an active area of $1 \times 1$ $cm^2$. After coating, the electrodes were dried at 60° C. for 12 hours prior to electrochemical testing.

Results

Figure 3:
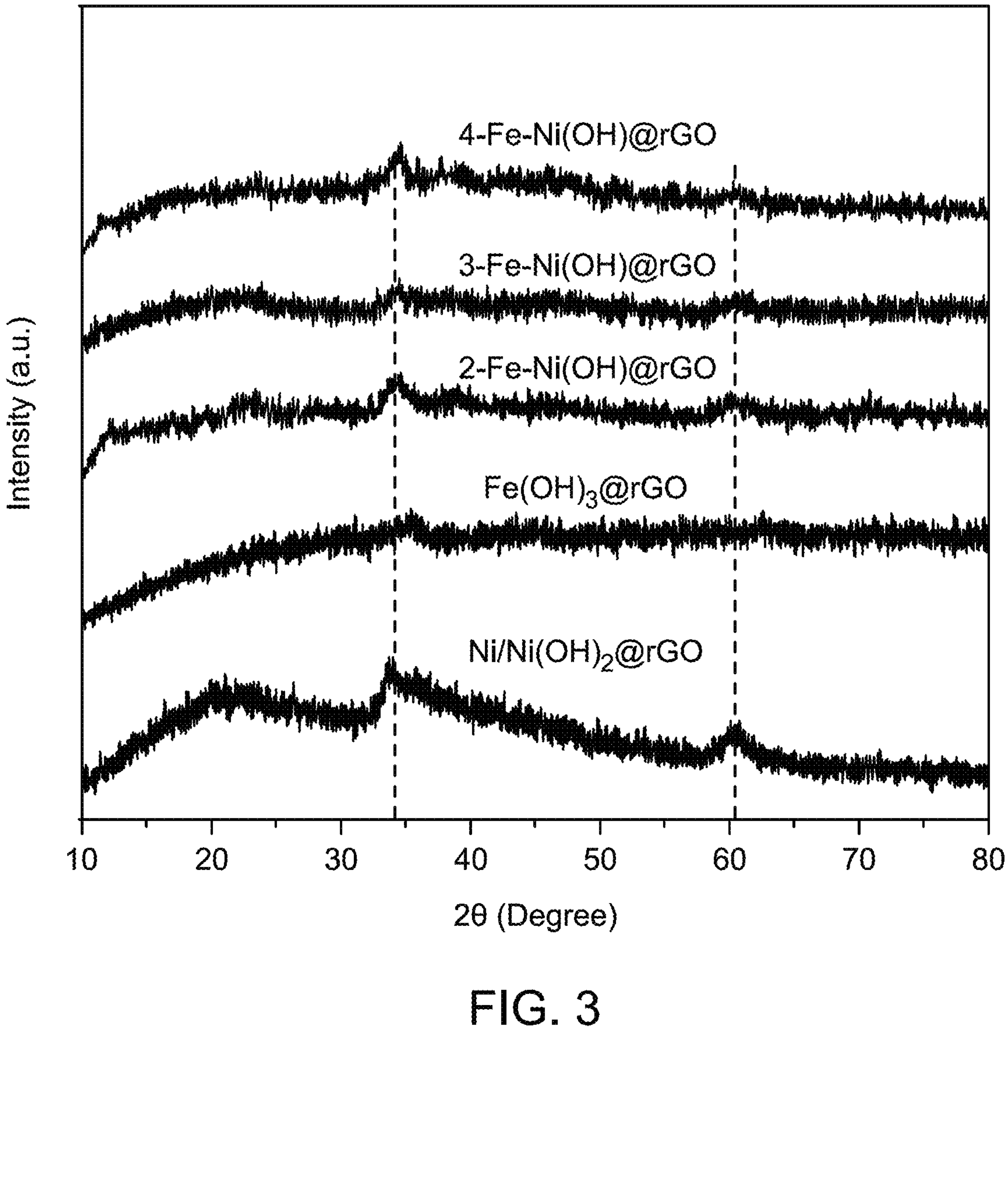
FIG. 3 is an X-ray diffraction (XRD) patterns of mesoporous monometallic Ni/Ni$(OH)_2$@rGO and bimetallic Fe—Ni(OH)@rGO catalyst, according to certain embodiments.
Figure 4A:
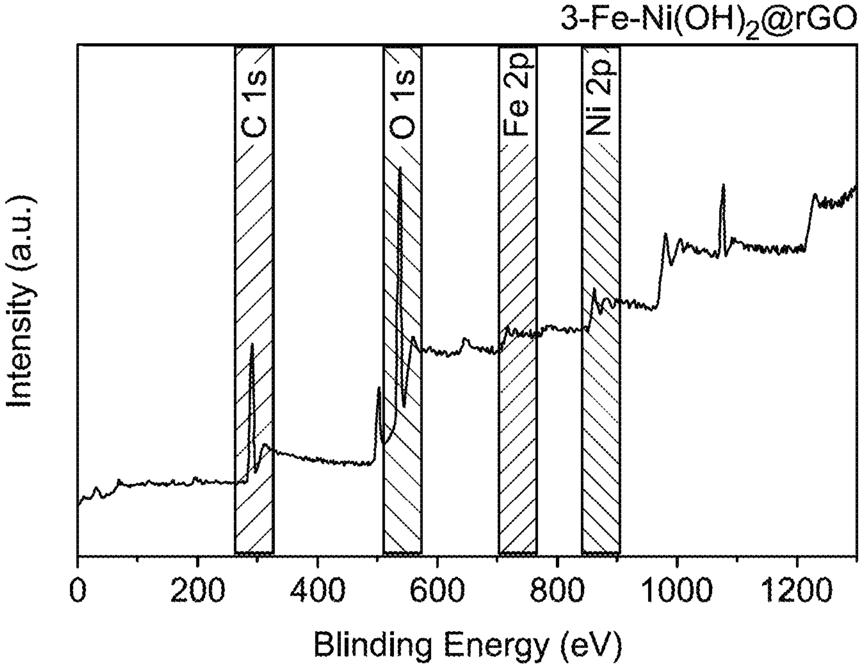
FIG. 4A is an X-ray Photoelectron Spectroscopy (XPS) survey spectrum of mesoporous 3-Fe—Ni(OH)@rGO catalyst, according to certain embodiments.
Figure 4B:
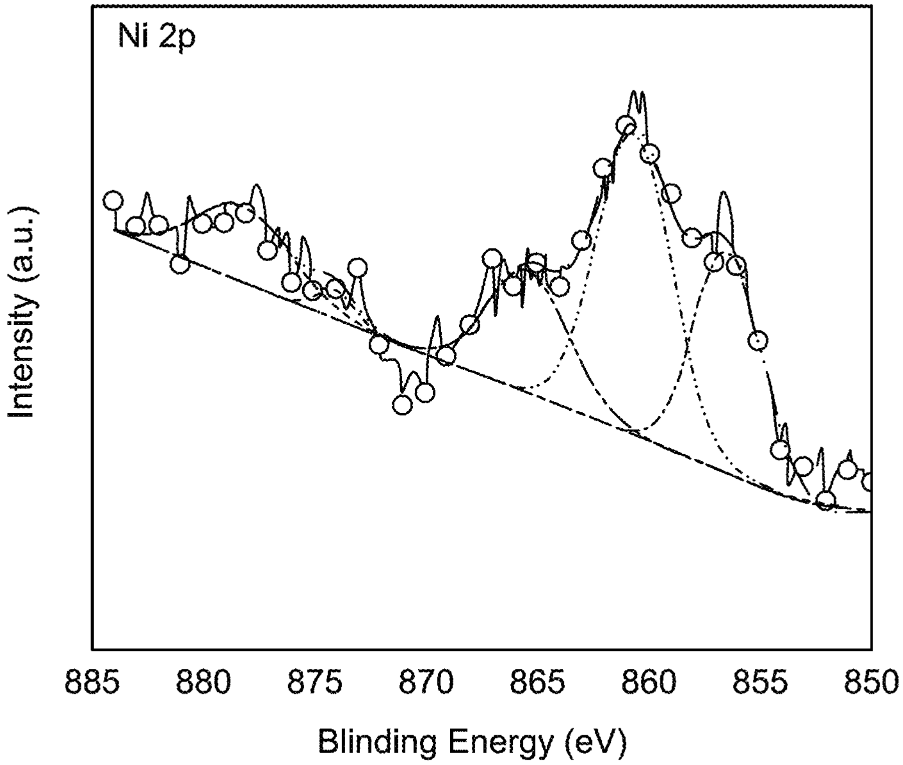
FIG. 4B is a high-resolution Ni 2p XPS spectra of mesoporous 3-Fe—Ni(OH)@rGO catalyst, according to certain embodiments.
Figure 4C:
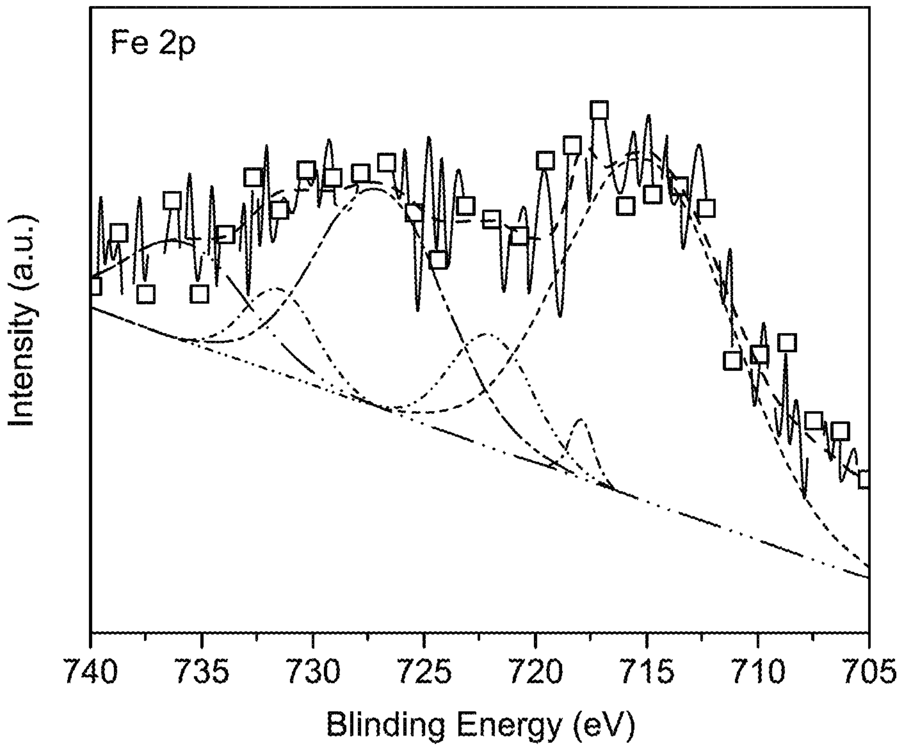
FIG. 4C is a high-resolution Fe 2p XPS spectra of mesoporous 3-Fe—Ni(OH)@rGO catalyst, according to certain embodiments.
Figure 4D:
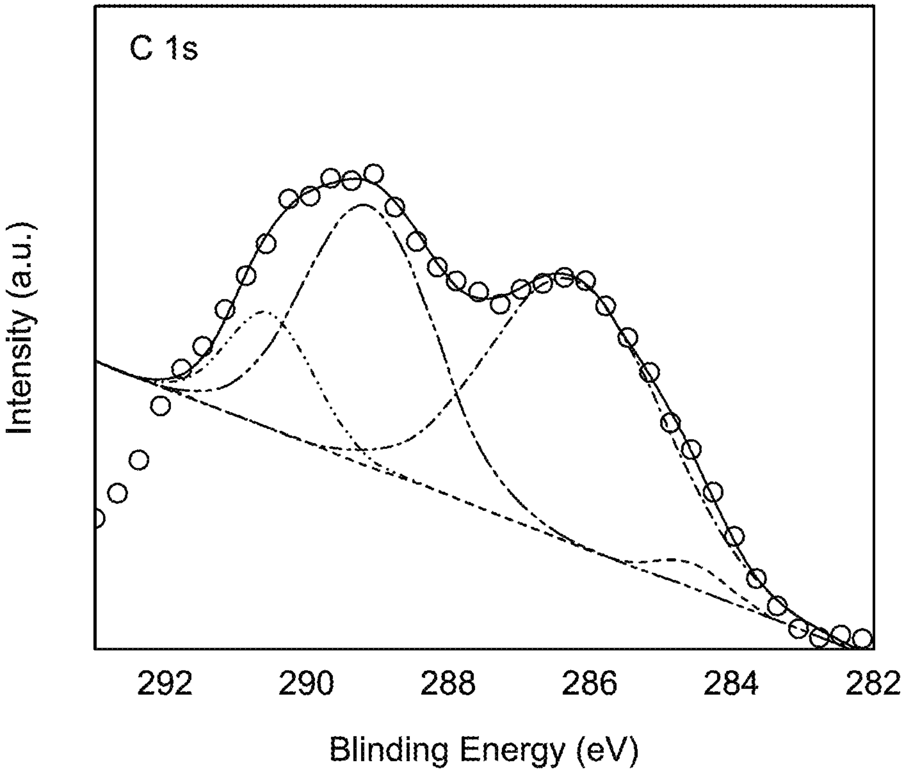
FIG. 4D is a high-resolution C 1s XPS spectra of mesoporous 3-Fe—Ni(OH)@rGO catalyst, according to certain embodiments.
Figure 4E:
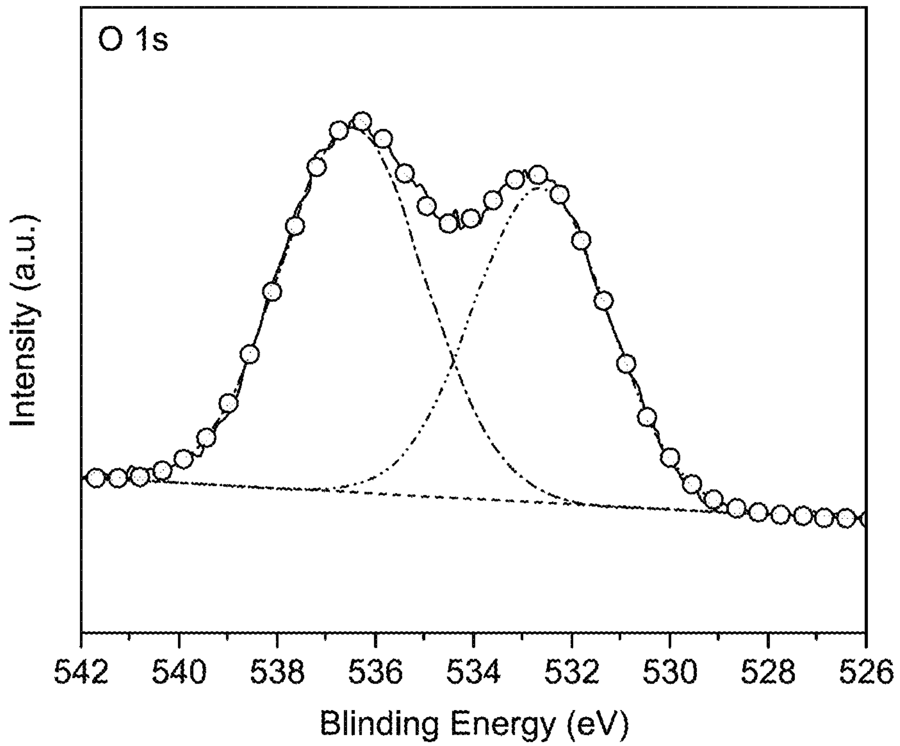
FIG. 4E is a high-resolution O 1s XPS spectra of mesoporous 3-Fe—Ni(OH)@rGO catalyst, according to certain embodiments.

X-ray diffraction (XRD) analysis confirmed the crystalline phases of $Ni/Ni(OH)_2$ and Fe—Ni(OH)@rGO catalysts, with characteristic diffraction peaks verifying the successful formation of $Ni(OH)_2$ and Fe—Ni hydroxide phases as shown in FIG. 3. The presence of broad diffraction peaks indicates a nanocrystalline nature and mesoporous structure, which are beneficial for enhancing oxygen evolution reaction (OER) activity by providing a high density of accessible active sites. Furthermore, the incorporation of Fe resulted in noticeable shifts in peak positions, suggesting lattice distortion and strengthened electronic interactions between Ni and Fe species, thereby contributing to improved catalytic performance.

X-ray photoelectron spectroscopy (XPS) analysis was carried out to investigate the surface chemical states and elemental composition of the catalysts as shown in FIGS. 4A-4E. The survey spectrum confirmed the presence of Ni, Fe, O, and C, indicating the successful formation of Fe—Ni hydroxide on the rGO surface. High-resolution XPS spectra of Ni 2p and Fe 2p revealed mixed oxidation states of $Ni^{2+}/Ni^{3+}$ and $Fe^{2+}/Fe^{3+}$, which are known to play a crucial role in enhancing oxygen evolution reaction (OER) activity. The C 1s spectrum confirmed the incorporation of reduced graphene oxide through the presence of characteristic functional groups such as C=C, C—O, and C=O, demonstrating the effective reduction of GO and improved electrical conductivity. Additionally, the O 1s spectrum indicated the presence of oxygen vacancies, which facilitate charge transfer and contribute to the improved OER performance of the catalysts.

Figure 5:
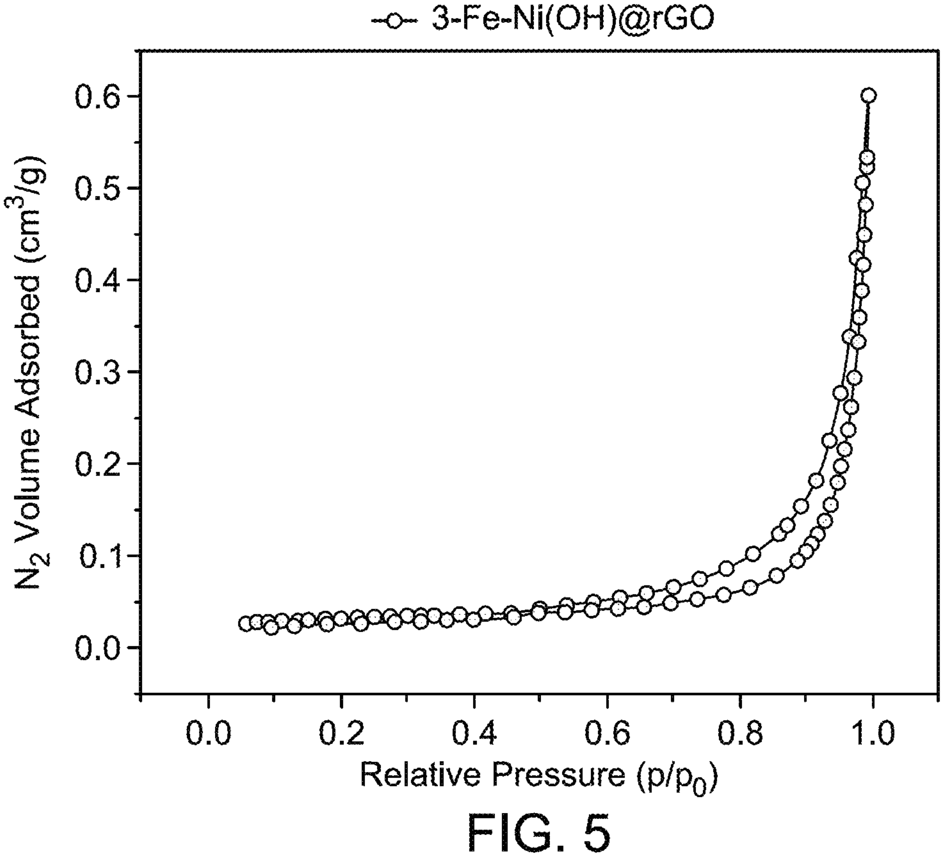
FIG. 5 is $N_2$ gas adsorption-desorption isotherm curves of mesoporous 3-Fe Ni(OH)@rGO catalyst, according to certain embodiments.
Figure 6A:
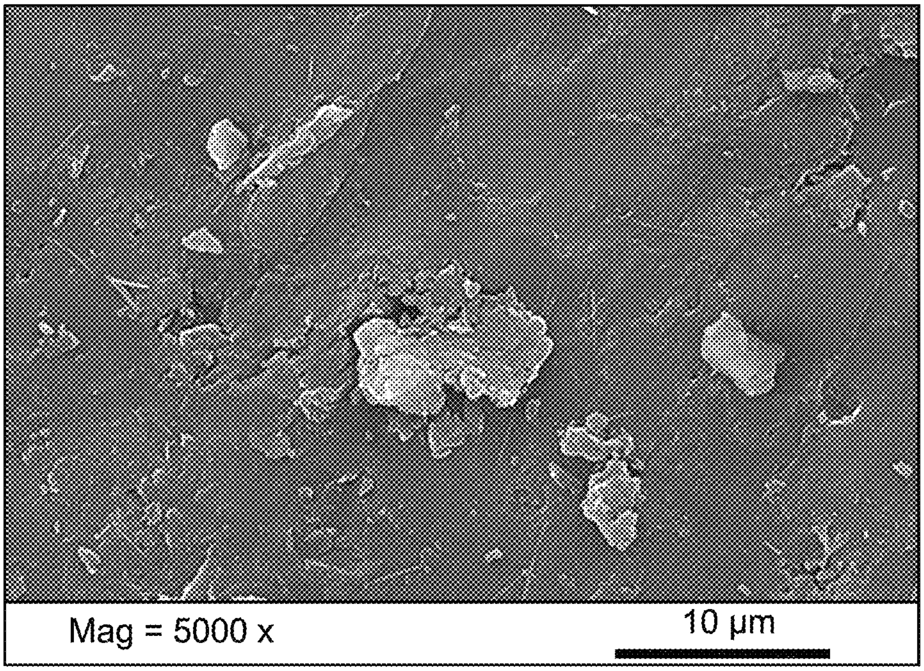
FIG. 6A is a scanning electron microscope (SEM) image of Ni/Ni$(OH)_2$@rGO, according to certain embodiments.
Figure 6B:
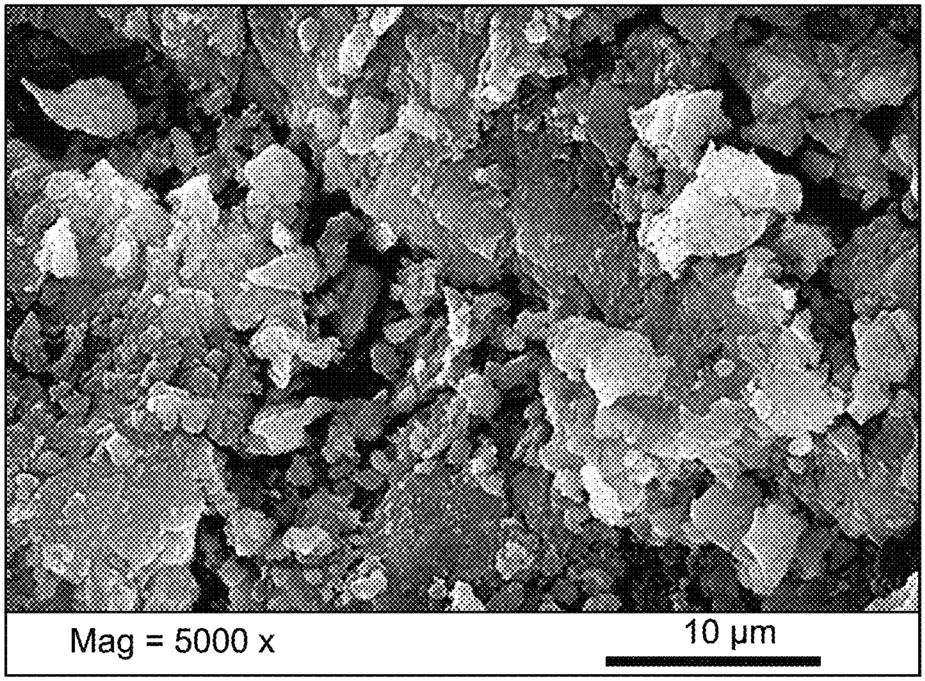
FIG. 6B is a SEM image of 3-Fe Ni(OH)@rGO at 10 μm magnification, according to certain embodiments.
Figure 6C:
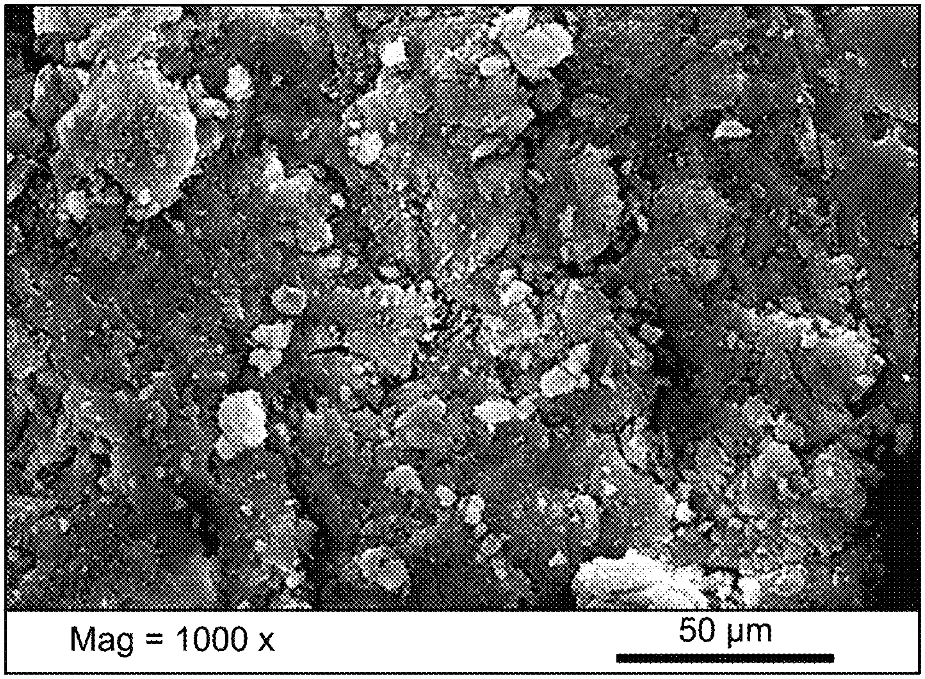
FIG. 6C is a SEM image of 3-Fe Ni(OH)@rGO at 50 μm magnification, according to certain embodiments.
Figure 6D:
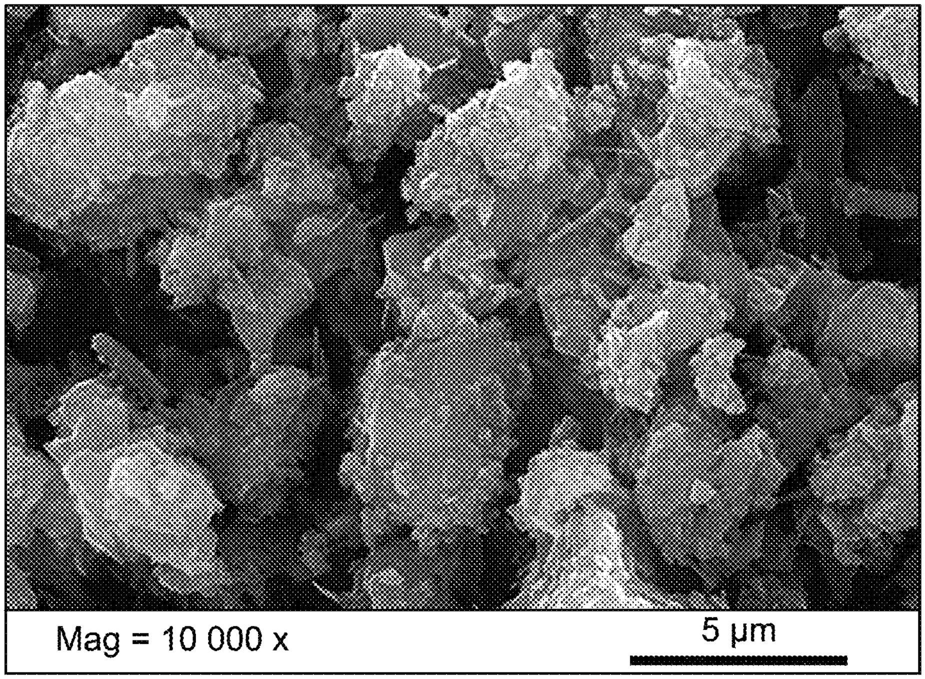
FIG. 6D is a SEM image of 4-Fe Ni(OH)@rGO at 5 μm magnification, according to certain embodiments.
Figure 6E:
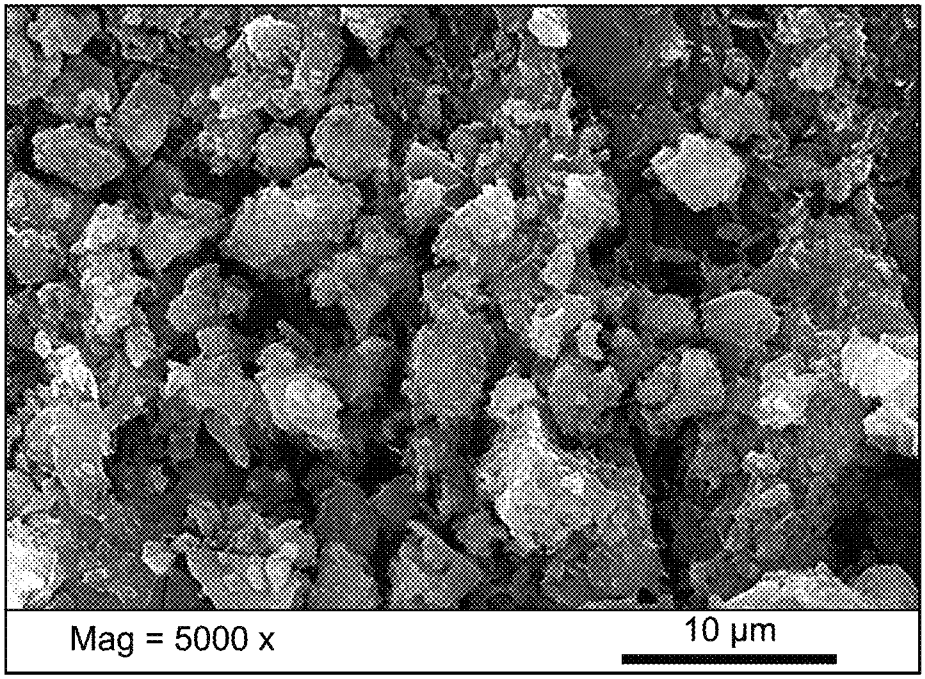
FIG. 6E is a SEM image of 4-Fe Ni(OH)@rGO at 50 μm magnification, according to certain embodiments.

Nitrogen adsorption—desorption isotherm analysis (BET surface area analysis) confirmed that the catalyst possesses a high specific surface area, which is essential for enhanced catalytic efficiency as shown in FIG. 5. The observed Type IV isotherm clearly indicates the mesoporous nature of the material, while the presence of distinct hysteresis loops suggests well-developed and interconnected pore structures. Such a high BET surface area ensures maximum exposure of active sites, thereby improving catalytic activity, and the mesoporous architecture facilitates efficient mass transport and charge transfer, both of which are critical for superior electrochemical performance.

Scanning electron microscopy (SEM) analysis revealed a well-dispersed Fe—Ni hydroxide structure uniformly anchored on the rGO sheets, confirming effective integration of the active phase with the conductive support as shown in FIGS. 6A-6E. The Ni/Ni$(OH)_2$@rGO sample exhibited a sheet-like morphology, indicating homogeneous dispersion of Ni species on the rGO surface. In contrast, the 3-Fe—Ni (OH)@rGO catalyst displayed a more interconnected and mesoporous architecture, which is advantageous for improved mass transport and enhanced structural stability during electrochemical operation. Furthermore, the 4-Fe—Ni(OH)@rGO sample showed increased porosity and a well-organized Fe—Ni hydroxide network, facilitating greater electrolyte accessibility and more efficient charge transfer, thereby contributing to superior catalytic performance.

Figure 7A:
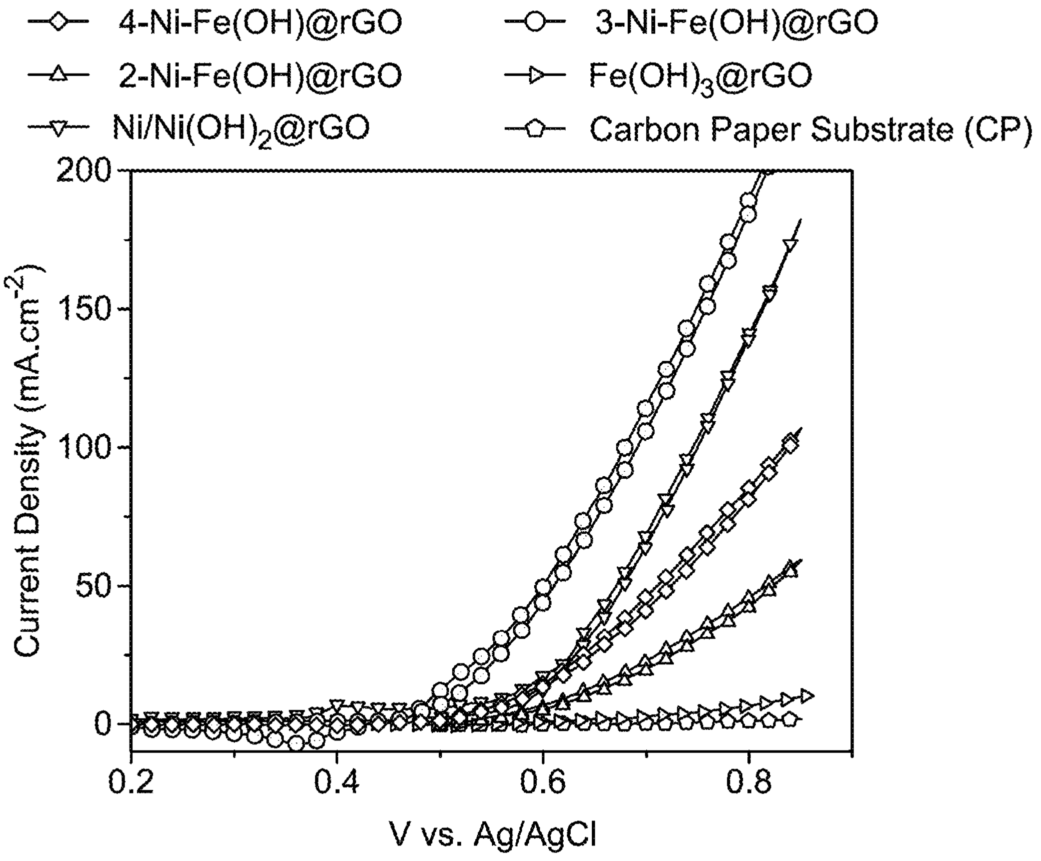
FIG. 7A is a cyclic voltammograms (CV) of 20 μg of monometallic Ni/Ni$(OH)_2$@rGO and bimetallic 3-Fe—Ni (OH)@rGO catalysts loaded on CP in 1.0 M NaOH at a scan rate of 50 mV/s, according to certain embodiments.
Figure 7B:
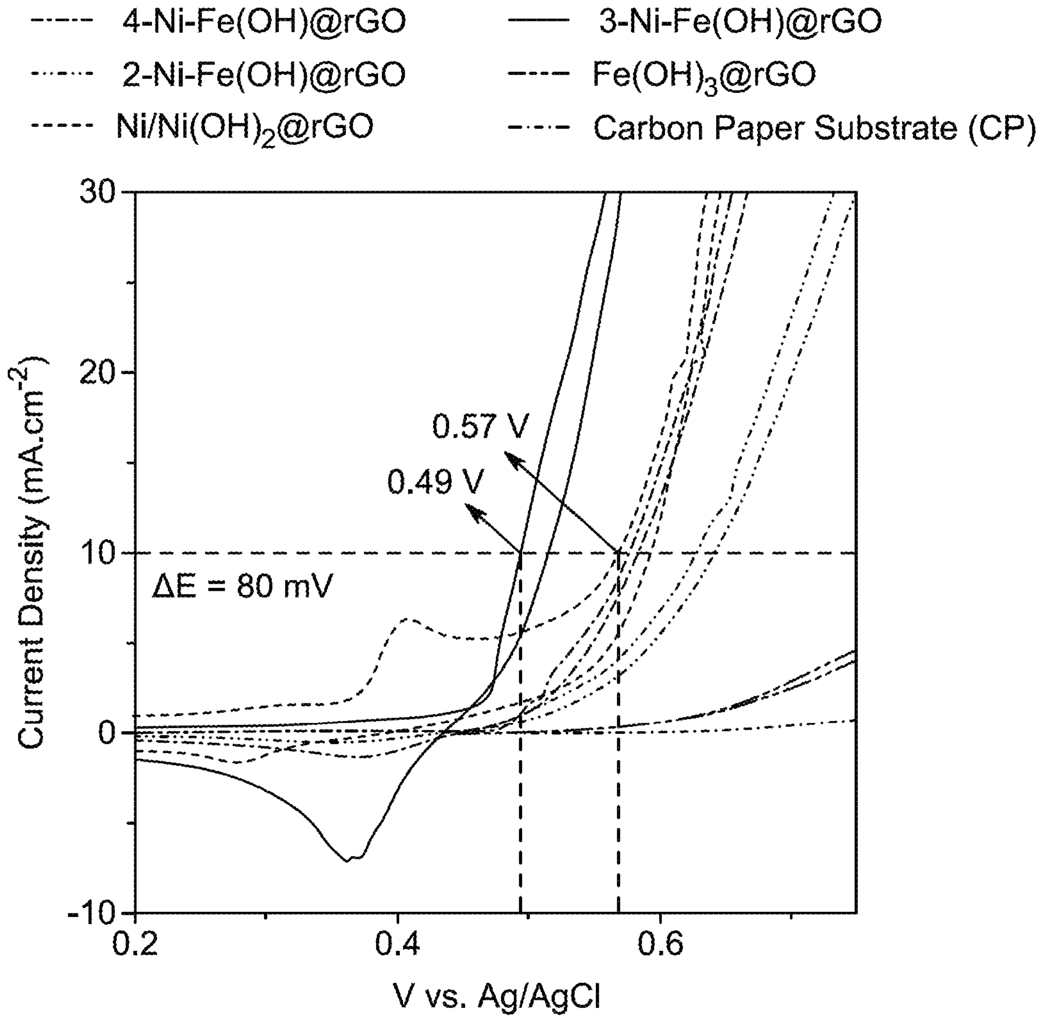
FIG. 7B is a graph showing overpotentials at a current density of 10 mA/cm$^2$, according to certain embodiments.

Cyclic voltammetry (CV) measurements for oxygen evolution reaction (OER) activity were carried out in a 1.0 M NaOH electrolyte using a standard three-electrode configuration, with 20 μg of catalyst loaded onto carbon paper (CP) electrodes as shown in FIGS. 7A-7B. The Fe—Ni(OH) @rGO catalyst exhibited a significantly higher anodic peak current density compared to the monometallic Ni/Ni(OH) $_2$@rGO, confirming its superior OER catalytic activity and faster reaction kinetics. Additionally, the bimetallic catalyst demonstrated a lower overpotential at a current density of 10 mA $cm^{-2}$, indicating enhanced catalytic efficiency. The incorporation of Fe into the Ni hydroxide matrix effectively optimizes electronic interactions, thereby lowering the activation energy barrier for OER and leading to improved electrochemical performance.

Figure 8:
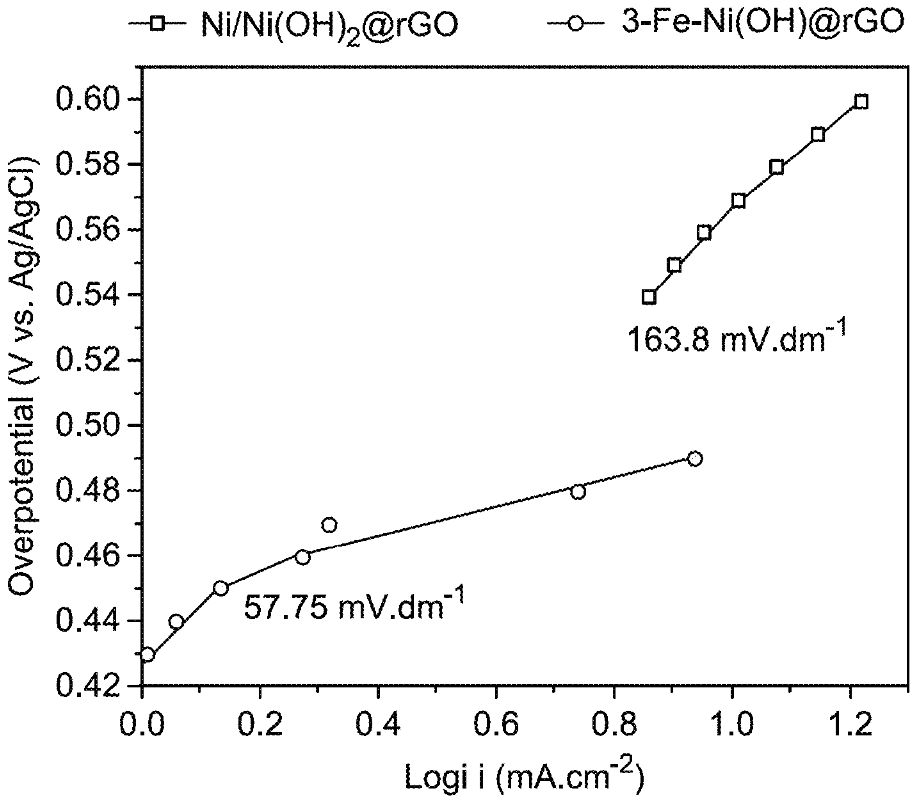
FIG. 8 is a tafel plots of 20 μg of monometallic Ni/Ni $(OH)_2$@rGO and bimetallic 3-Fe Ni(OH)@rGO catalysts loaded on CP in 1.0 M NaOH, according to certain embodiments.

Overpotential and Tafel slope measurements further highlighted the enhanced OER performance of the bimetallic catalysts. At a current density of 10 mA $cm^{-2}$, the Ni/Ni(OH) 2@rGO catalyst exhibited an overpotential of approximately 320 mV, whereas the 3-Fe—Ni$(OH)_2$@rGO catalyst showed a significantly lower overpotential of about 280 mV, indicating superior catalytic efficiency. Correspondingly, the Tafel slope of Ni/Ni$(OH)_2$@rGO was measured to be 85 mV $dec^{-1}$, reflecting slower reaction kinetics, while the 3-Fe—Ni(OH)@rGO catalyst displayed a much lower Tafel slope of 60 mV $dec^{-1}$ (FIG. 8). This reduced Tafel slope indicates faster electron transfer and improved OER kinetics. Overall, the Fe—Ni hydroxide-rGO hybrid structure effectively accelerates charge transfer processes, leading to enhanced catalytic activity and improved OER performance.

Electrochemical stability of the catalysts was evaluated using chronoamperometry and accelerated durability tests. Chronoamperometric measurements performed at a constant current density of 10 mA $cm^{-2}$ showed less than 5% loss in activity after 4 hours of continuous operation, demonstrating excellent operational stability. Furthermore, accelerated stability testing over 5000 cyclic voltammetry (CV) cycles revealed that the catalyst retained approximately 85% of its initial catalytic activity, confirming its robust structural integrity and long-term durability under OER operating conditions.

The present disclosure demonstrates that the developed Fe—Ni(OH)@rGO catalyst is a highly efficient oxygen evolution reaction (OER) electrocatalyst, exhibiting a significantly lower overpotential compared to conventional Ni—Fe-based catalysts. The incorporation of reduced graphene oxide (rGO) markedly improves charge transfer and electrical conductivity, while the robust hybrid structure ensures enhanced durability with stable performance over prolonged electrochemical cycling. The synthesis strategy is scalable and environmentally friendly, utilizing starch as a natural surfactant and liquid-crystal template, thereby eliminating the need for toxic chemicals and complex procedures. Owing to the use of low-cost materials and simple processing steps, the method holds strong potential for large-scale production. Overall, the invention successfully demonstrates an innovative, sustainable, and high-performance Fe—Ni (OH)@rGO catalyst with superior electrochemical properties for oxygen evolution reactions. The synergistic combination of liquid crystal template-assisted synthesis, in-situ $NaBH_4$ reduction, and rGO integration results in a cost-effective, scalable, and highly active electrocatalyst suitable for applications in green hydrogen production, fuel cells, and advanced energy storage devices.

Numerous modifications and variations of the present disclosure are possible in light of the above teachings. It is therefore to be understood that within the scope of the appended claims, the invention may be practiced otherwise than as specifically described herein.

The invention claimed is:

1. A method of forming a catalyst comprising an iron-nickel hydroxide supported on reduced graphene oxide, the method comprising:

mixing starch, water and graphene oxide to form a template mixture;

mixing a first volume of a nickel precursor solution and a second volume of an iron precursor solution with the template mixture to form a bimetallic mixture;

casting the bimetallic mixture;

partially drying the bimetallic mixture to form a semi-dry bimetallic gel;

reacting the semi-dry bimetallic gel with sodium borohydride by spraying a sodium borohydride solution on the semi-dry bimetallic gel to at least partially reduce the semi-dry bimetallic gel and form an iron-nickel hydroxide reduced graphene oxide mixture; and washing with water and subsequently drying the iron-nickel hydroxide reduced graphene oxide mixture to obtain the catalyst.

2. The method of claim 1, wherein the reacting of the semi-dry bimetallic gel with sodium borohydride is at a temperature of 20° C. to 80° C.

3. The method of claim 1, wherein during the drying of the iron-nickel hydroxide reduced graphene oxide mixture, the iron-nickel hydroxide reduced graphene oxide mixture is centrifuged and dried at 40° C. to 80° C.

4. The method of claim 1, wherein the sodium borohydride solution has a 0.5 to 1.5 molar concentration of sodium borohydride.

5. The method of claim 1, wherein the nickel precursor solution comprises nickel nitrate hexahydrate at a 0.25 to 1.0 molar concentration.

6. The method of claim 1, wherein the iron precursor solution comprises iron sulfate heptahydrate at a 0.25 to 1.0 molar concentration.

7. The method of claim 1, wherein a ratio of second volume:first volume is from 2:5 to 4:5.

8. The method of claim 1, wherein the catalyst has a mesoporous structure.

9. The method of claim 8, wherein the mesoporous structure has oxygen vacancies.

10. The method of claim 1, wherein the catalyst has a nanocrystalline structure.

11. The method of claim 1, wherein the iron-nickel hydroxide is uniformly dispersed on the reduced graphene oxide.

12. The method of claim 1, wherein the catalyst has $Ni^{2+}/Ni^{3+}$ and $Fe^{2+}/Fe^{3+}$ oxidation states.

13. The method of claim 1, wherein the catalyst is characterized by a tafel slope from 50 mV/dec to 70 m V/dec when the catalyst is loaded on carbon paper electrode in 1 M NaOH and by an overpotential of less than 400 mV at 10 $mA/cm^2$ based on cyclic voltammetry of the catalyst loaded on carbon paper electrode in 1 M NaOH at a scan rate of 50 mV/s.

14. The method of claim 1, wherein during chronoamperometry electrochemical stability testing of the catalyst, the catalyst exhibits a catalytic activity loss less than 2% after 4 hours at 10 mA/cm2, and during accelerated electrochemical stability testing of the catalyst, the catalyst retains from 80% to 90% of its initial catalytic activity after 4,500 to 5,500 cyclic voltammetry cycles in alkaline media.

15. A method of forming a catalyst comprising a nickel hydroxide supported on reduced graphene oxide, the method comprising:

mixing starch, water and graphene oxide to form a template mixture;

mixing a nickel precursor solution with the template mixture to form a metallic mixture;

casting the metallic mixture;

partially drying the metallic mixture to form a semi-dry metallic gel;

reacting the semi-dry metallic gel with sodium borohydride by spraying a sodium borohydride solution on the semi-dry metallic gel to at least partially reduce the semi-dry metallic gel and form a nickel/nickel hydroxide reduced graphene oxide mixture; and washing with water, and subsequently drying the nickel/nickel hydroxide reduced graphene oxide mixture to obtain the catalyst.

16. The method of claim 15, wherein the nickel/nickel hydroxide has a nickel metal core coated with a layer of nickel (II) hydroxide.

17. The method of claim 15, wherein reacting the semi-dry metallic gel with sodium borohydride is achieved at 20° C. to 80° C.

18. The method of claim 15, wherein the catalyst has a morphology of a sheet.

* * * * *